US011042409B2

(12) United States Patent
Hrivnak

(10) Patent No.: US 11,042,409 B2
(45) Date of Patent: Jun. 22, 2021

(54) LEADER ELECTION WITH LIFETIME TERM

(71) Applicant: Red Hat, Inc., Raleigh, NC (US)

(72) Inventor: Michael John Hrivnak, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 115 days.

(21) Appl. No.: 16/268,766

(22) Filed: Feb. 6, 2019

(65) Prior Publication Data
US 2020/0249994 A1 Aug. 6, 2020

(51) Int. Cl.
G06F 9/46 (2006.01)
G06F 9/50 (2006.01)
G06F 16/11 (2019.01)
G06F 9/48 (2006.01)

(52) U.S. Cl.
CPC .......... *G06F 9/5011* (2013.01); *G06F 9/4881* (2013.01); *G06F 16/11* (2019.01)

(58) Field of Classification Search
None
See application file for complete search history.

(56) References Cited

U.S. PATENT DOCUMENTS

| 6,226,717 B1* | 5/2001 | Reuter | G06F 9/524 711/147 |
|---|---|---|---|
| 9,298,513 B2 | 3/2016 | Goodman | |
| 9,645,811 B2 | 5/2017 | Carlen et al. | |
| 2008/0019366 A1* | 1/2008 | Fischer | H04L 69/22 370/392 |
| 2011/0302265 A1 | 12/2011 | Singh et al. | |
| 2019/0340017 A1* | 11/2019 | Scheuer | G06F 16/2379 |

OTHER PUBLICATIONS

Kubernetes, "Simple Leader Election with Kubernetes and Docker", https://kubernetes.io/blog/2016/01/simple-leader-election-with-kubernetes/, Jan. 11, 2016, 3 pages.
Ashpole, David, et al., GitHub, Inc., "Kubernetes-CHANGELOG-1.9.md", https://github.com/kubernetes/kubernetes/blob/master/CHANGELOG-1.9.md, Oct. 31, 2018, 64 pages.
Microsoft, "Leader Election Pattern", https://docs.microsoft.com/en-us/azure/architecture/patterns/leader-election, Jun. 22, 2017, 10 pages.
VanLightly, Jack, "RabbitMQ vs Kafka Part 6—Fault Tolerance and High Availability with Kafka", https://jack-vanlightly.com/blog/2018/9/2/rabbitmq-vs-kafka-part-6-fault-tolerance-and-high-availability-with-kafka, Sep. 5, 2018, 54 pages.

* cited by examiner

Primary Examiner — Gregory A Kessler
(74) Attorney, Agent, or Firm — Lowenstein Sandler LLP

(57) ABSTRACT

A processing device receives request from a process of a plurality of processes of a clusterized service, to attempt to obtain exclusive access to a predetermined resource associated with a leader state of the plurality of processes. Responsive to successfully obtaining the exclusive access to the predetermined resource, the processing device enables the process to enter the leader state. The processing device enables the process to stay in the leader state for the lifetime of the process.

20 Claims, 7 Drawing Sheets

LEADER ELECTION WITH LIFETIME TERM

TECHNICAL FIELD

Embodiments of the present invention relate generally to computer systems, and more specifically to methods of performing leader election with lifetime term.

BACKGROUND

Data centers may include clusters consisting of multiple hosts (e.g., physical servers). Each of the hosts may run one or more containers, such that each container provides an isolated execution environment in the user space of the host operating system, sharing the kernel with other containers. Each container executes one or more related processes providing a certain service (e.g., an HTTP server, a database server, etc.).

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
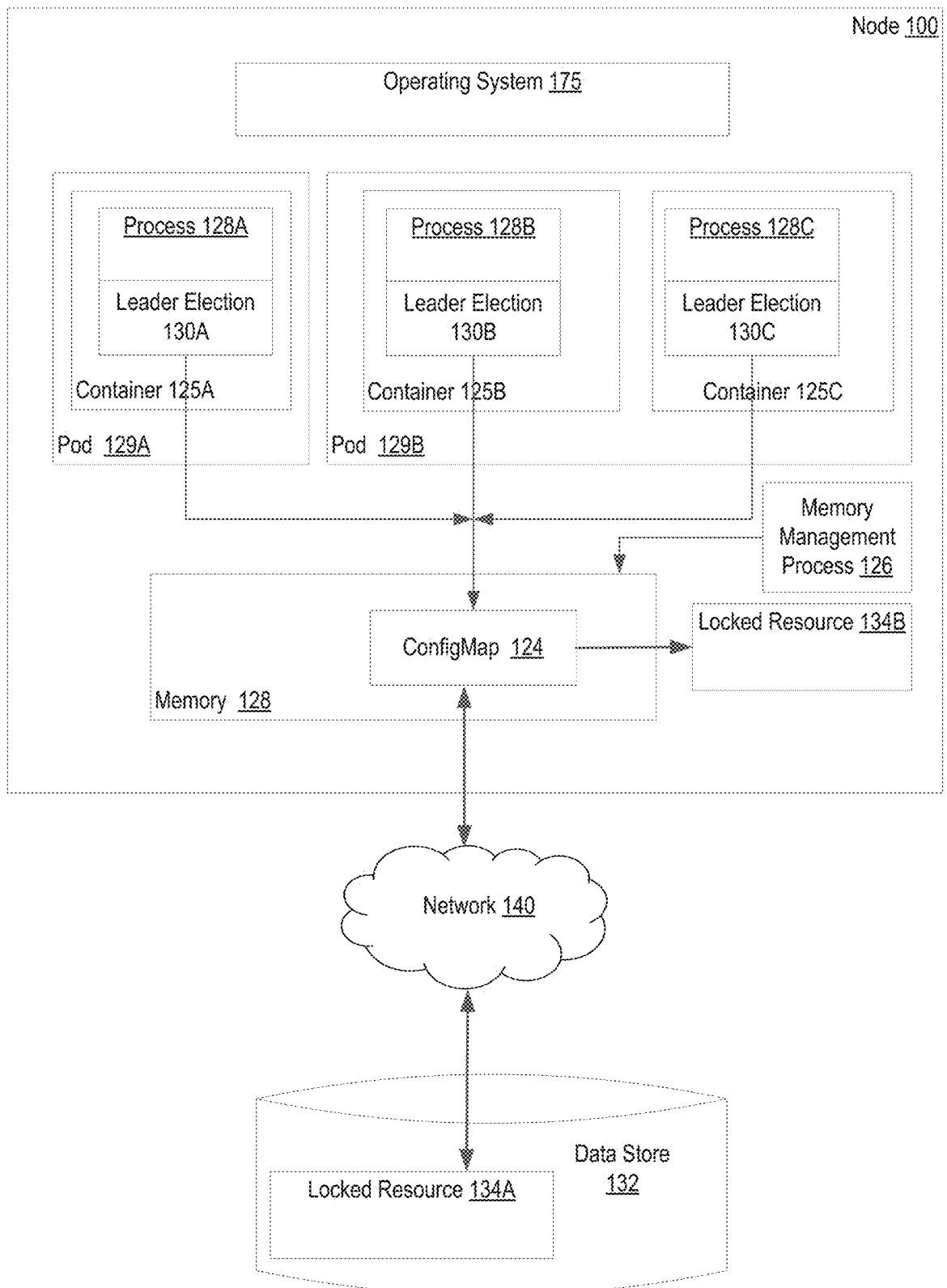
FIG. 1 is a block diagram of a computer system representing a host system, in accordance with one implementation.

Described herein are methods and systems for leader election with a lifetime term. In a clusterized service, which may include a plurality of instances of the same executable code (referred to as "plurality of processes herein"), the leader process may need to be elected in situations when only one process is expected to provide authoritative response to incoming client requests and/or to perform load distribution among other processes of the clusterized service. A cluster is a set of loosely or tightly connected computers that work together so that they may be viewed, in many respects, as single system consisting of multiple nodes. For example, a virtual router service may include one master ("leader") instance and one or more standby instances, one of which would become the master instance if the current master instance becomes unresponsive or is terminated. As an example of the leader process, a web service may need to become the leader process in order to access a database table that enforces uniqueness constraints to insert new records. In another example, the leader process may be a thread in a multi-threaded application attempting to update a global object residing in a memory (e.g., the main memory or a storage memory).

In common implementations, the leader process is expected to continually send heartbeat signals to confirm that it is still alive and responsive, while the other processes of the cluster are expected to perform new leader election responsive to failing to receive the heartbeat signal within a predetermined period of time. In these implementations, an existing leader process may, upon expiration of a timeout or occurrence of another triggering event, either renew its lease to stay in the leader role or step down so another process may be elected to the leader role. If the lease is not renewed or a leader has stepped down, a new leader election is performed. In these implementations, it would be possible for two leaders to coexist concurrently at least for a brief period of time, potentially causing memory corruption or data collision. In one example, for the lease management solution to be effective at preventing dual leadership, the clocks of all candidate processes should be synchronized so that lease expiration would be detected by each process at the same time. For example, the concurrent leader processes may coexist because the clock of one process may not be synchronized with the clock of the other process, thus the indication that the lease has not been renewed may be perceived by each process at a different time. Consequently, this variance in detection of lease renewal may result in unpredictable results because two leader processes are present and may attempt to update the same data currently, for example. This synchronization and delay management aspects of the traditional solutions add overhead and complexities in the hardware and software layers of a leader election system.

Aspects of the present disclosure address the above-noted and other deficiencies by introducing the lifetime term for the leader process, thus eliminating the need for sending heartbeats or otherwise renewing the leader status. The leader election procedure may involve obtaining exclusive access to a predetermined resource: one or more candidate processes of the plurality of processes of the cluster would attempt to obtain exclusive access to the predetermined resource, and only one candidate process would succeed (by virtue of the access being exclusive), thus becoming the leader for its lifetime. In an illustrative example, the predetermined resource may be represented by a memory object (e.g., a lock or a ConfigMap object in a Kubernetes environment) or a file with a predetermined name. When a process obtains exclusive access to the predetermined resource, such a process becomes the leader process, while the other processes in the cluster may determine that a leader process exists because attempts to gain exclusive access to the predetermined resource by the other processes would fail. When the leader process is eventually terminated, the exclusive access to the predetermined resource is released by an operating system process and another process may succeed in obtaining an exclusive access to the predetermined resource and may become the new leader with a lifetime term.

In an illustrative example, multiple processes within a cluster may compete to enter a leader state. A cluster is a set of loosely or tightly connected computers that work together so that they may be viewed, in many respects, as single system consisting of multiple nodes. The leader state is an exclusive state which at any given moment of time is associated with not more than one process of the cluster. As noted herein above, to enter the leader state, a process may attempt to obtain exclusive access to a predetermined resource which is employed as the marker for the leader state of the cluster. In one implementation, in a Kubernetes environment, the predetermined resource may be a represented by an object of a predetermined type (e.g., Config-Map object) with respect to which the environment would enforce uniqueness constraints. Thus, in order to enter the leader state, a process would attempt to create the Config-Map. Kubernetes is an open-source system for deployment, scaling, and management of containerized application. A ConfigMap is an object that binds configuration information to containers and system components at runtime to enable sharing of information among system components, including processes. When a process is able to create the Config-Map object, the process enters the leader state and further attempts to create the ConfigMap by other processes would fail. The ConfigMap object may have a unique name known to the multiple processes in the cluster to ensure exclusive access to the object as follows: when the leader process creates the ConfigMap, the operating system may prevent subsequent attempts to create a ConfigMap with the known name because one already exists. Further, the ConfigMap may have a property identifying its owner (i.e., the owner reference). The owner reference of the ConfigMap identifies the leader process, such that when the leader process is terminated the ConfigMap may be deleted from memory, for example by a garbage collector process.

In another illustrative example, the predetermined resource may be represented by a file having a predetermined name known to the processes in the cluster as identifying the leader state marker file. In order to for a process to enter a leader state, the process may attempt to create the file at a predetermined location in the file system. Further, the operating system may ensure exclusive access to the file by causing subsequent attempts to create the file with the predetermined name in the predetermined location to fail if the file already exists. The operating system process may also ensure the lifetime term for the leader process by maintaining control over the file at the predetermined location so that it may not be deleted by another process. When the process in the leader state is eventually terminated, an operating system process may delete the file, thus signaling to the other processes that no leader process currently exists in the cluster. The operating system process may be represented by any kernel process that is responsible for cleaning up data items and files that are not in use.

In an embodiment of the present disclosure, when a process enters the leader state, by successfully gaining exclusive access to the predetermined resource, the process is expected to stay in the leader state for the lifetime of the process. Thus, the process would not need to renew the leader state lease. Because the process is expected to maintain the leader state for its lifetime, the process also would maintain the exclusive access to the predetermined resource, thus signaling to the other processes of the cluster that the leader state may be occupied. Accordingly, when another processes attempt to obtain exclusive access the predetermined resource, such an attempt would fail because the exclusive access to predetermined resource is already obtained by the leader process. The processes competing for the leader state may periodically repeat the attempt to obtain exclusive access to the predetermined resource. In one example, processes may repeat the attempt to obtain exclusive access to the predetermined resource at the expiration of a configurable interval of time. The configurable interval of time may be defined as a number of seconds. After a failed attempt to obtain exclusive access to the predetermined resource, a process may reset a counter to zero and then may start to increment the counter every second. When the value of the counter reaches the configurable interval of time, the process may repeat the attempt to obtain exclusive access to the predetermined resource and may reset the counter to zero. The process of resetting the counter and repeating the attempt to obtain exclusive access to the predetermined resource may continue until the process is eventually able to gain the exclusive access to the predetermined resource and enter the leader state. The predetermined resource may have an owner reference parameter identifying the leader process.

In one embodiment, when the lifetime of the process in the leader state eventually ends because the process has been terminated, an operating system process (such as a garbage collector process) may detect that the leader process has been terminated, and thus the predetermined resource utilized as the leader marker should be released. The operating system process may make that determination because the owner reference of the predetermined resource is associated with the leader process that is now terminated. The operating system process may then release the exclusive access to the predetermined resource, thus signaling to the other processes in the environment that the leader state may be available. In one example, the operating system process may be a garbage collector process and the predetermined resource may be a memory object. In another example, another operating system process may delete a file associated with the leader state when detecting that the leader process has been terminated.

This method of leader election with lifetime term enables a reliable process of electing a leader without the need for lease renewal or handling of leader stepdown decisions, resulting in a simplified process of leader election with minimal dependency on synchronized hardware and software resources. Further, the method disclosed herein eliminates the possibility of having two concurrent leaders because a process in the leader state may continue to be the leader, with no additional leader election tasks, until the end of its lifetime.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

Various aspects of the above referenced methods and systems are described in details herein below are targeted at improving the efficiency and reliability of resource contention handling in distributed computing environments by enabling a leader election process with lifetime term.

FIG. 1 is a block diagram that illustrates an embodiment of a computer system (referred to herein as node 100) that hosts one or more containers 125A-C in a Kubernetes environment. Node 100 may comprise one or more computing devices with one or more processors communicatively coupled to memory devices and input/output (I/O) devices. Node 100 may refer to a computing device (e.g., physical machine), a virtual machine, or a combination thereof. A node may provide one or more levels of virtualization such as hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel. The memory 128 may include volatile memory devices (e.g., random access memory (RAM)), non-volatile memory devices (e.g., flash memory), and/or other types of memory devices.

Node 100 may provide operating system level virtualization by running a computer program that provides computing resources to one or more containers 125A-C. Operating system level virtualization may be implemented within the kernel of operating system 123 and may enable the existence of multiple isolated containers. In one example, operating system level virtualization may not require hardware support and may impose little to no overhead because programs within each of the containers may use the system calls of the same underlying operating system 123. Operating system level virtualization may provide resource management features that isolate or limit the impact of one container (e.g., container 125A) on the resources of another container (e.g., container 125B or 125C).

The operating system level virtualization may provide a pool of computing resources that are accessible by container 125A and are isolated from one or more other containers (e.g., container 125B). The pool of resources may include filesystem resources (e.g., particular volumes), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of filesystem limits, disk limits, input/out (I/O) limits, memory limits, CPU limits, network limits, other limits, or a combination thereof.

Operating system 123 may provide containers 125A-C with access to computing resources. The operating system may wrap one or more processes (e.g., an instance of a particular service) in a complete filesystem that contains the code, runtime, system tools, system libraries, and other data present on the node that may be used by the processes executing within the container. Operating system 123 may manage the execution of processes 128A-C.

Each of the containers 125A-C may refer to a resource-constrained process space of node 100 that may execute functionality of a program. Containers 125A-C may be referred to as a user-space instances or a virtualization engines (VE) and may appear to a user as a standalone instance of the user space of operating system 123. Each of the containers 125A-C may share the same kernel but may be constrained to use only a defined set of computing resources (e.g., CPU, memory, I/O). An embodiment of the disclosure may create one or more containers to host a framework or provide other functionality of a service (e.g., web application functionality, database functionality) and may therefore be referred to as "service containers" or "application containers."

Pods 129A and 129B may be data structures that are used to organize one or more containers 125A-C and enhance sharing between containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 100. In another example, the containers associated with a particular pod may be located on different nodes that are on the same or different physical machines.

Processes 128A-C may be instances of any computing services in a clusterized environment that can receive, transmit, or process requests and perform one or more computing tasks in view of the requests. Further, processes 128A-C may be a plurality of instances of the same executable code (referred to as "plurality of processes herein"). In one example, processes 128A-C may include one or more web services, database services, filesystem services, networking services, messaging services, load balancing services, clustering services, configuration management services, other services, or a combination thereof. Each process may be executed on node 100 and may function as a client process, a server process, or a combination thereof.

Data store 132 may be represented by any repository that is capable of storing one or more files, storage metadata, storage lease information, disk images, or a combination thereof. Data store 132 may be accessible to node 100 via network 140. Data store 132 may include block-based storage devices, file-based storage devices, other storage device, or a combination thereof. Block-based storage devices may provide access to consolidated block-based (e.g., block-level) data storage and may include one or more devices (e.g., Storage Area Network (SAN) devices). Block-based storage devices may be accessible over network 140 and may appear to an operating system of a computing device as locally attached storage. File-based storage devices may provide access to consolidated file-based (e.g., file-level) data storage using one or more data storage devices (e.g., Network Attached Storage (NAS) devices) that may be accessible over network 140. In one example, a secondary storage with data store 132 may employ file-based storage that may provide access to a locked resource 134A that may need to be accessed by the leader process.

Locked resource 134A may be a software or hardware resource that may be accessed by one process at a time via network 140, thus in order to access locked resource 134A a process needs to be the leader process. In one example, locked resource 134A may be a database table with uniqueness constraint where records may be created or updated by one process at a time because one or more columns in the table require unique values. In another example, the locked resource may be a global object residing in a memory (e.g., the main memory or a storage memory) and the leader process may be a thread in a multi-threaded application attempting to update the global object. Similarly, locked resource 134B may be a local software or hardware resource that is hosted locally on node 100, and that may be accessed by one process at a time. The leader process may gain access to locked resources 134A-B through the creation of ConfigMap object 124.

ConfigMap 124 may be an object that binds configuration information to containers and system components at runtime to enable sharing of information among processes 128A-C. When one of processes 128A-C creates ConfigMap 124, the process enters a leader state and further attempts to create ConfigMap 124 by the other processes would fail. ConfigMap 124 may have a unique name known to processes 128A-C. Further, ConfigMap 124 may have an owner reference that is associated with the process in the leader state. The owner reference of the ConfigMap ties the ConfigMap to the process in the leader state, such that when the leader process is terminated, memory management process 126 may delete ConfigMap 124 from memory.

Memory management process 126 may be responsible for monitoring memory allocation and reclaiming memory occupied by objects that are no longer in use by any process. When the lifetime of the process in the leader state eventually ends, the leader state may become available to other processes. This is accomplished via memory management process 126 by detecting that ConfigMap 124 should be deleted from memory when the leader process is no longer alive. Memory management process 126 may establish that ConfigMap 124 should be deleted because the owner reference of ConfigMap 124 is associated with a process that has been terminated. Memory management process 126 may then delete ConfigMap 124 from memory, thus signaling to the other processes that the leader state may be available. In one example, memory management process 126 may be a garbage collector process that identifies an object for deletion based on the allocation status of its parent process.

Figure 2:
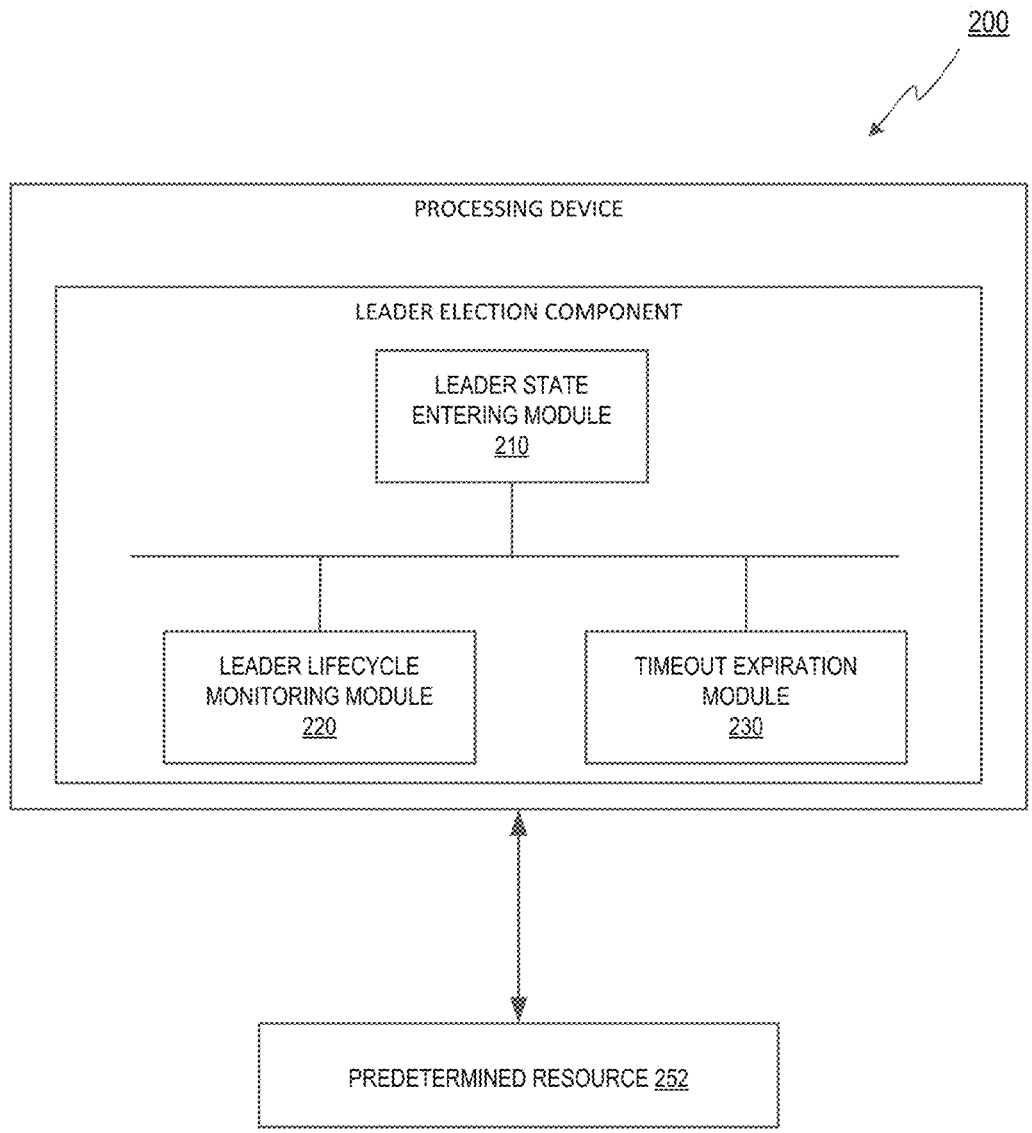
FIG. 2 depicts a block diagram of an example computer system in accordance with one or more aspects of the present disclosure.

FIG. 2 depicts a block diagram of an example computer system 200 in accordance with one or more aspects of the present disclosure. Computer system 200 may include one or more processing devices and one or more memory devices. In the example shown, computer system 200 may include a leader state entering software module 210, a leader lifetime monitoring software module 220, and a timeout expiration software module 230. The leader state entering module 210 may be where processes attempt to enter a leader state to perform a task that may be performed by one process at a time. In one example, the processes may need to enter the leader state to execute a workload that may involve creating records in a data store that enforces uniqueness constraints. To enter the leader state, a process may attempt to obtain exclusive access to a predetermined resource which is employed as the marker for the leader state of the cluster. In one example, the predetermined resource may be a file with a predetermined name known to processes in the cluster as identifying the leader state marker file. Obtaining an exclusive access to the predetermined resources may involve creating the file in a local or remote file system. When the file is successfully created by a process, the process enters the leader state. Further, an operating system process may ensure exclusive access to the file by causing subsequent attempts to create the file with the predetermined name to fail if the file already exists. When a process enters the leader state, by successfully creating the file, the process may stay in the leader state for its lifetime.

Leader lifetime monitoring module 220 may be responsible for cleaning up resources when the leader process is terminated. The process in the leader state may maintain exclusive access to a predetermined resource through its lifetime, thus signaling to the other processes that the leader state may be occupied. When the process in the leader state is eventually terminated, an operating system process may subsequently release the exclusive access to the predetermined resource, thus signaling to the other processes that the leader state may be available. For example, the operating system process may be a garbage collector process or another kernel process that is responsible for data clean up. In an illustrative example, the predetermined resource may be a file with a predetermined name and releasing the exclusive access to the predetermined resource may be deleting the physical file from a file system. In this example, when the lifetime of the process in the leader state eventually ends, the operating system process may detect that the leader process has been terminated and a file associated with the leader state may be deleted from the file system. In doing so, the operating system process signals the other processes in the cluster that the leader state may be available and subsequent attempts to create the file and enter the leader state by a second process would succeed. The second process would then stay in the leader state for its lifetime.

The timeout expiration module 230 may be responsible for determining the time period that a second process may need to wait before repeating its attempt to enter the leader state. When a first process enters the leader state, by successfully gaining an exclusive access to a predetermined resource, the first process may stay in the leader state for its lifetime. Accordingly, when a second process attempts to gain exclusive access to the predetermined resource, the attempt would fail because the process in the leader state already holds the exclusive access to the resource. The second process competing for the leader state may repeat the attempt to obtain exclusive access to the predetermined resource periodically. In one example, the second process may repeat the attempt to gain an exclusive access to the predetermined resource at the expiration of a configurable interval of time. The configurable interval of time, referenced herein as the timeout expiration period, may be defined as a number of seconds. After a failed attempt to access the resource exclusively, the second process may reset a counter to zero and then may start to increment the counter every second. When the value of the counter reaches the configurable interval of time, the second process may repeat the attempt to access the resource and reset the counter to zero. The sequence of resetting the counter and repeating the attempt may continue until the second process is eventually able to gain the exclusive access to the predetermined resource and enter the leader state.

In another example, the timeout expiration period may be determined based on an exponential backoff algorithm where the timeout period may be longer with each repetition. Exponential backoff refers to an algorithm used to space out repeated transmission of the same block of data, often to avoid network congestion. The transmission may be delayed by an amount of time derived from the number of attempts to retransmit, according to the formula: time delay=$2^R-1$, where R is the repetition count. For example, after the first failed attempt, the process may wait for $(2^1-1)=1$ second, and after the second attempt, the process may wait for $(2^2-1)=3$ seconds, and so on. As the number of attempts increases, the timeout period for delay may increase exponentially. Further, to avoid unreasonably long delays with repeated attempts, or when there are a large number of processes competing to enter the leader state, a ceiling value for the timeout period may be defined so that after a certain number of repetitions, the timeout value may reach the ceiling value and may not increase any further.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., node 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 3:
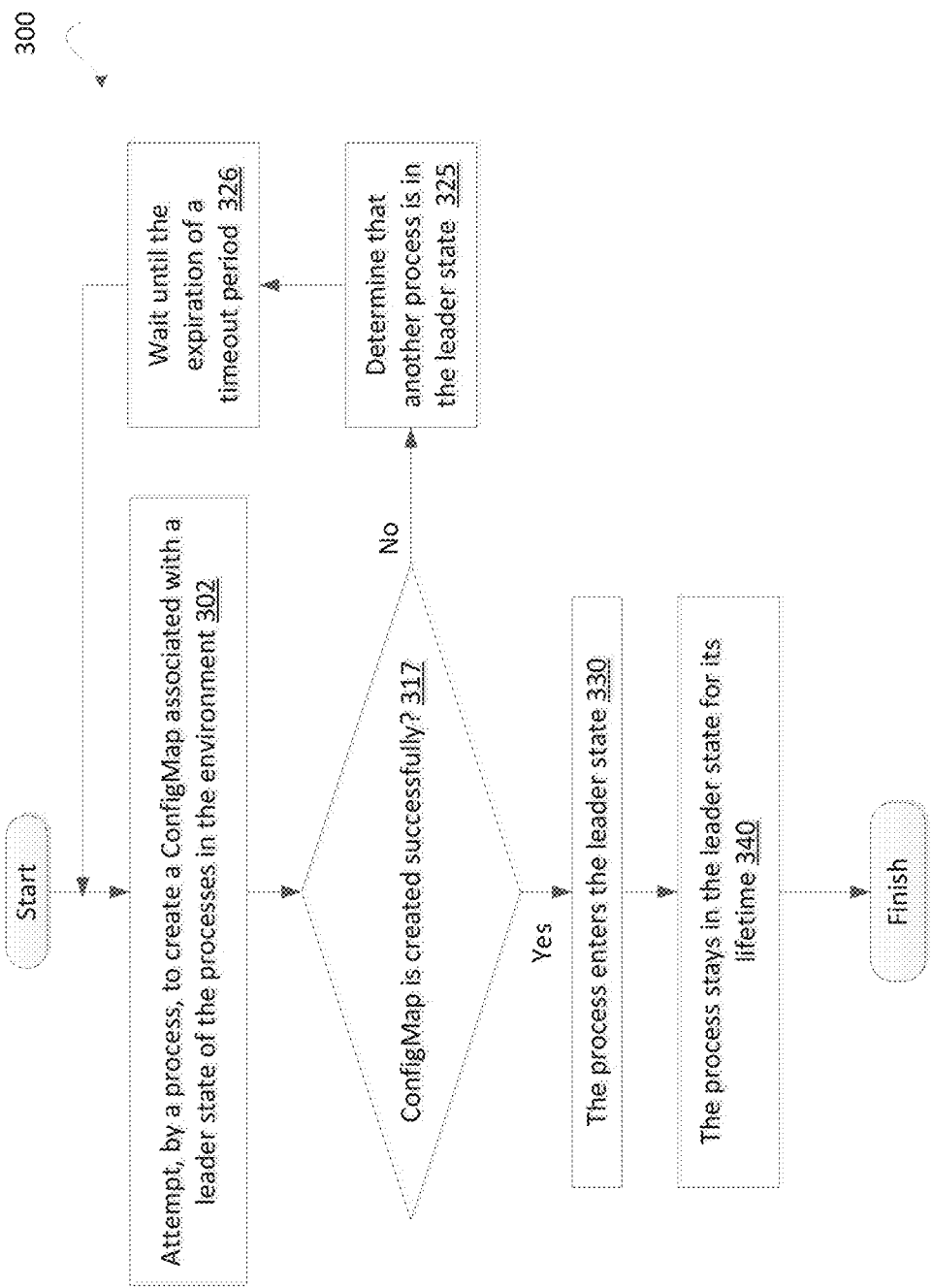
FIG. 3 is a flow diagram illustrating one embodiment for a method of performing leader election with lifetime term in a Kubernetes environment.

FIG. 3 is flow diagrams of an embodiment of a method related to leader election with lifetime term in a Kubernetes environment. The method is performed by processing logic that may include hardware (circuitry, dedicated logic, etc.), software (such as is run on a general purpose computer system or a dedicated machine), or a combination of both. In one implementation, the method may be performed by one or more leader election modules from one or more computer systems, referred to herein as processing logic. The flow diagram illustrates one embodiment for a method 300 of processing leader election module. At block 302 of method 300, processing logic may attempt to create a ConfigMap object associated with a leader state of the processes in the cluster. A ConfigMap is an object that binds configuration information to containers and system components at runtime to enable sharing of information among system components. In one example, processes may need to enter the leader state to execute a workload that may involve creating records in a data store that enforces uniqueness constraints. To enter the leader state, a process may attempt to obtain exclusive access to a predetermined resource which is employed as the marker for the leader state of the cluster. In one example, the predetermined resource may be a ConfigMap and obtaining an exclusive access to the predetermined resources may be creating the ConfigMap. When a process creates the ConfigMap, the process enters the leader state, further attempts to create the ConfigMap by the other processes would fail. The ConfigMap may have a unique name known to the processes in the cluster and may also have an owner reference that is associated with the process in the leader state, tying the ConfigMap to the process in the leader state.

At block 317, the processing logic determines whether the ConfigMap has been created successfully. If ConfigMap has been created by the processing logic, then the leader state may have been vacant and the process that created the ConfigMap may be the new leader, thus the process may enter the leader state at block 330. Other processes may not be allowed to create the ConfigMap for the lifetime of the process. The process stays in the leader state for its lifetime at 340. Further, the ConfigMap may be associated with an owner reference parameter equal to the identifier of the process currently in the leader state.

If the processing logic determines that the ConfigMap has not been successfully created, indicating that another process may be in the leader state at 325, the processing logic may wait until the expiration of a timeout period at 326 before repeating the attempt to create the ConfigMap. In one example, the processing logic may repeat the attempt to create the ConfigMap object at the expiration of a configurable interval of time. The configurable interval of time, referenced herein as the timeout expiration period, may be defined as a number of seconds. After a failed attempt to create ConfigMap, a process may reset a counter to zero and then may start to increment the counter every second. When the value of the counter reaches the configurable interval of time, the processing logic may repeat the attempt to create the ConfigMap and reset the counter to zero. The process of resetting the counter and repeating the attempt to create the ConfigMap may continue until the processing logic is eventually able to create the ConfigMap and enter the leader state.

In another example, the timeout expiration period may be determined based on an exponential backoff algorithm where the timeout period may be longer with each repetition. Exponential backoff may refer to an algorithm used to space out repeated transmissions of the same block of data, often to avoid network congestion. The transmission may be delayed by an amount of time derived from the number of attempts to retransmit, according to the formula: time delay=$2^R-1$, where R is the repetition count. In one example, in order to avoid unreasonably long delays with repeated attempts or when there are a large number of processes competing to enter the leader state, a ceiling value for the timeout period may be defined so that after a certain number of repetitions, the timeout value reaches the ceiling value and does not increase any further.

After waiting for the expiration of the timeout period, the processing logic may repeat the attempt to create the ConfigMap to enter the leader state at 302.

Figure 4:
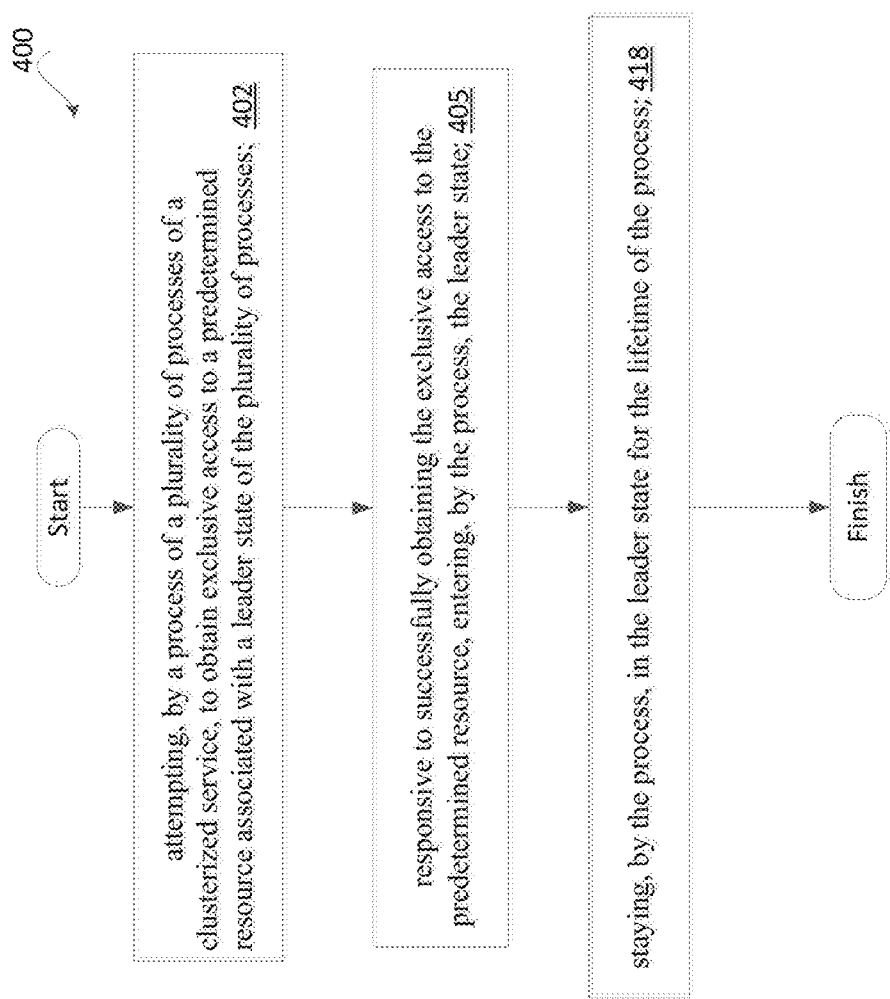
FIG. 4 is a flow diagram illustrating another embodiment for a method of processing a leader election module with lifetime term.

FIG. 4 is a flow diagram illustrating one embodiment for a method 400 of processing a leader election module with lifetime term. At block 402 of method 400, processing logic may attempt to obtain exclusive access to a predetermined resource associated with a leader state of a plurality of processes. In one example, the predetermined resource may be a ConfigMap associated with a leader state of the plurality of processes. Processes may need to enter the leader state to execute a workload that may involve creating records in a data store that enforces uniqueness constraints. Obtaining an exclusive access to the predetermined resource may be creating the ConfigMap. When the ConfigMap is created by a process, the process enters the leader state. Further attempts to create the ConfigMap by the other processes of the plurality of processes would fail.

At block 405, responsive to successfully obtaining the exclusive access to the predetermined resource, the processing logic may enable a process to enter the leader state. Other processes may not be allowed to create the ConfigMap for the lifetime of the process currently in the leader state. The ConfigMap may be identified by a unique name known to the processes. The ConfigMap may have an owner reference identifying the process currently in the leader state. Finally, at 418, the processing logic may maintain the process in the leader state for the lifetime of the process. Further, the process in the leader state may maintain exclusive access of the ConfigMap for the duration of the process's lifetime, thus signaling to the other processes that the leader state may be occupied.

Figure 5:
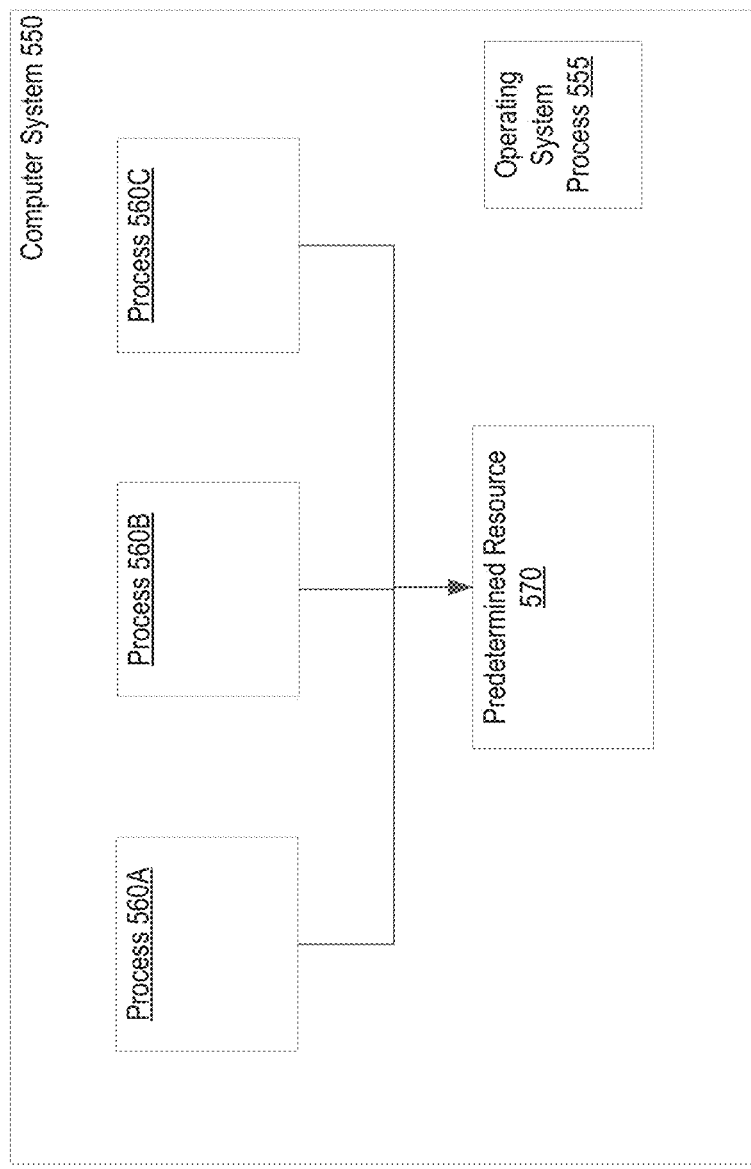
FIG. 5 is a block diagram of an example computer system, in accordance with one implementation.

FIG. 5 is a block diagram of an example computer system, in accordance with one implementation. Computer system 550 may comprise one or more computing devices with one or more processors communicatively coupled to memory devices and input/output (I/O) devices. Computer system 550 may refer to a computing device (e.g., physical machine), a virtual machine, or a combination thereof.

Computer system 550 may provide operating system level virtualization by running a computer program that provides computing resources to processes 560A-C.

Processes 560A-C may be instances of any computing services that can receive, transmit, or process requests and perform one or more computing tasks in view of the requests. In one example, processes 560A-C may include one or more web services, database services, filesystem services, networking services, messaging services, load balancing services, clustering services, configuration management services, other services, or a combination thereof. Each process may be executed on computer system 550 and may function as a client process, a server process, or a combination thereof. The processes may execute on a single virtual machine or spread across multiple machines.

Predetermined resource 570 may be a software resource associated with a leader state of the cluster. Processes 560A-C may attempt to obtain exclusive access to predetermined resource 570 to enter the leader state of the cluster. In an illustrative example, predetermined resource 570 may be a file with a predetermined file name that may be created on a predetermined location in the file system. When one of processes 560A-C creates the file, the process enters a leader state and further attempts to create the file by the other processes would fail. The file may have a predetermined name known to processes 560A-C as identifying the leader state marker file. Further, when the process in the leader state is terminated, an operating system process 555 may delete the file, thus signaling to the other processes that the leader state may be available.

Operating system process 555 may be responsible for monitoring the lifetime of the process in the leader state and releasing an exclusive access to the predetermined resource 570 when the leader process is terminated. The operating system process may by any kernel process that is responsible for cleaning up data items and files that are not in use. In an illustrative example, when the lifetime of the process in the leader state eventually ends, operating system process 555 may detect that the leader process has been terminated and may delete the leader state marker file associated from the file system. In doing so, the operating system process 555 signals processes 560A-C that the leader state may be available.

Figure 6:
FIG. 6 is a flow diagram illustrating a method for monitoring the lifetime of a process in the leader state, according to one embodiment.

FIG. 6 is a flow diagram illustrating method 600 of monitoring the lifetime of a process in the leader state, according to one embodiment. At block 502 of method 600, process 1 of the plurality of processes successfully allocates ConfigMap object and enters into a leader state. In one example, Process 1 may need to enter the leader state to execute a workload that may involve creating records in a data store that enforces uniqueness constraints. When Process 1 enters the leader state, attempts to allocate the ConfigMap by the other processes in the cluster would fail, thus preventing the other processes from entering the leader state.

At block 505, Process 1 may stay in the leader state through its lifetime. While in the leader state, an identifier of Process 1 is associated with the ConfigMap as an owner reference. Process 1 may maintain ownership of the ConfigMap through its lifetime and the ConfigMap t may not be deallocated for the lifetime of the owner process. Accordingly, other processes may not successfully allocate the same ConfigMap.

Process 1 lifetime may eventually be terminated at block 510. When terminated, Process 1 no longer consumes memory space and associated objects and buffers may be deallocated from memory by a memory management process. In one example, the memory management process may be a garbage collector process that may identify an object for deletion because the process identified by its owner reference is no longer alive. In one example, the garbage collector process may then deallocate the object from memory. At 515, the garbage collector process may recognize that the ConfigMap has Process 1 identifier as the owner reference. The garbage collector process may recognize that Process 1 has been terminated because Process 1 may no longer have buffers allocated in memory.

At block 525, the garbage collector process may then deallocate the ConfigMap from memory. When the ConfigMap is deallocated from memory, a second process may be successful at allocating the ConfigMap. In order to detect the availability of the leader state, the processes in the cluster periodically attempt to allocate the ConfigMap either at predefined or calculated intervals of time. Thus at block 530, when Process 2 attempts to allocate the ConfigMap to enter the leader state in its next scheduled attempt, the attempt to allocate the ConfigMap would be successful. Process 2 may allocate the ConfigMap and may enter the leader state for the duration of its lifetime. The ConfigMap may now have Process 2 identifier assigned to its owner reference parameter.

Figure 7:
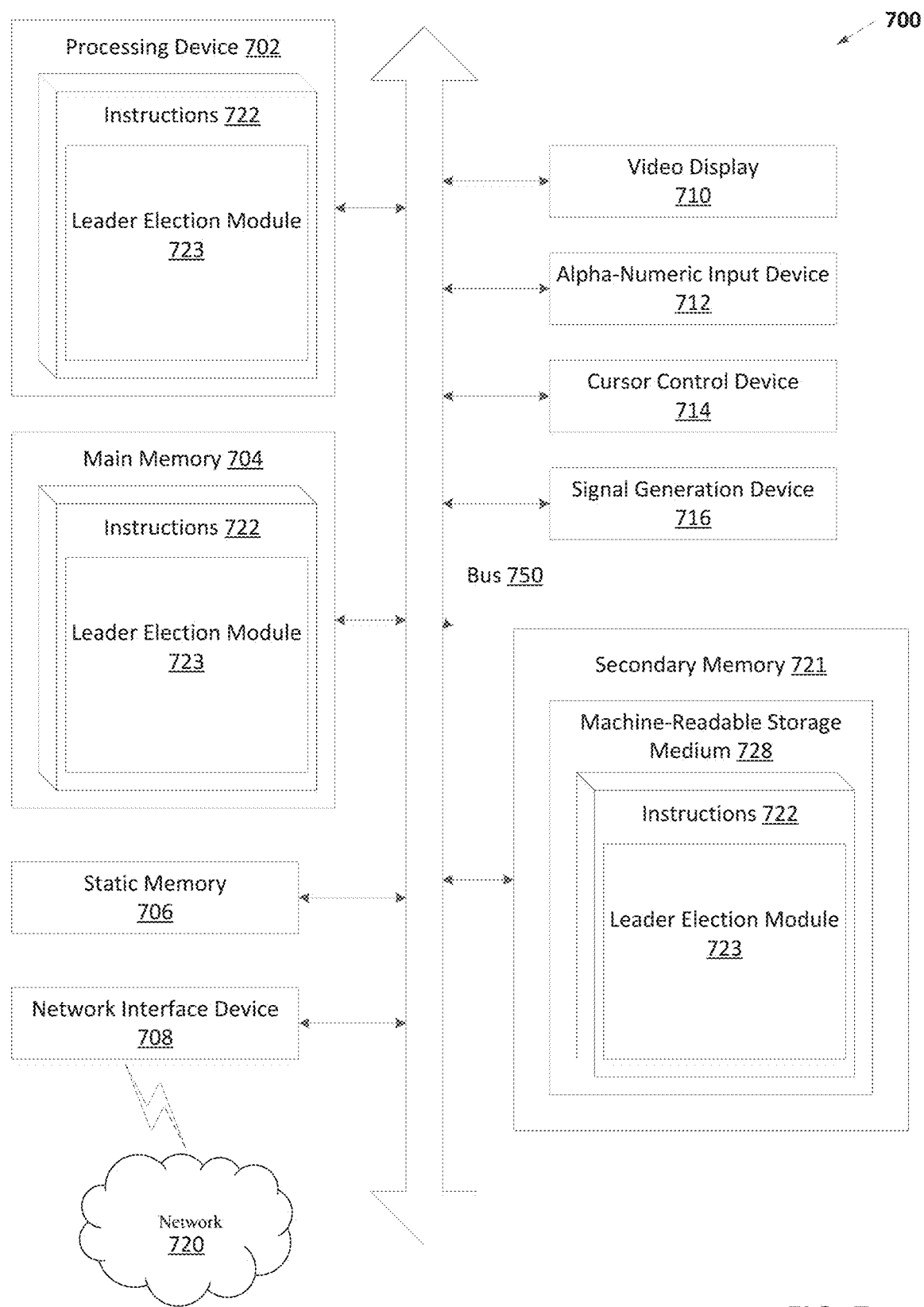
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. The computer system 700 may correspond to a node 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 750.

The processing device 702 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 721 may include a machine-readable storage medium (or more specifically a computer-readable storage medium) 728 on which is stored one or more sets of instructions 722 embodying any one or more of the methodologies or functions described herein (e.g., leader election module 723). The instructions 722 may also reside, completely or at least partially, within the main memory 704 and/or within the processing device 702 during execution thereof by the computer system 700; the main memory 704 and the processing device 702 also constituting machine-readable storage media.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a transitory medium such as a carrier wave that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "determining", "using", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

attempting, by a process of a plurality of processes of a clusterized service, to obtain exclusive access to a configuration binding memory object associated with a leader state of the plurality of processes;

responsive to successfully obtaining the exclusive access to the configuration binding memory object, entering, by the process, the leader state; and staying, by the process, in the leader state for a lifetime of the process.

2. The method of claim 1, wherein attempting to obtain exclusive access to the configuration binding memory object associated with the leader state further comprises:
responsive to failing to obtain the exclusive access to the configuration binding memory object, repeating an attempt to obtain the exclusive access to the configuration binding memory object upon expiration of a timeout.

3. The method of claim 1, whereas attempting to obtain exclusive access to the configuration binding memory object comprises attempting to allocate the configuration binding memory object.

4. The method of claim 1 further comprises:
responsive to determining that the lifetime of the process has ended, releasing, by an operating system process, exclusive access to the configuration binding memory object.

5. The method of claim 4, whereas the operating system process is a garbage collector process.

6. The method of claim 1, wherein the configuration binding memory object is a ConfigMap object.

7. The method of claim 1, wherein the configuration binding memory object comprises an owner reference identifying the process in the leader state.

8. A system comprising:
a memory; and
a processing device operatively coupled to the memory, wherein the processing device comprises a plurality of processes of a clusterized service, and wherein a process of the plurality of processes to:
attempt to obtain exclusive access to a configuration binding memory object associated with a leader state of the plurality of processes;
responsive to successfully obtaining the exclusive access to the configuration binding memory object, enter the leader state; and
stay in the leader state for a lifetime of the process.

9. The system of claim 8, wherein attempt to obtain exclusive access to the configuration binding memory object associated with the leader state further comprises:
responsive to failing to obtain the exclusive access to the configuration binding memory object, repeat an attempt to obtain the exclusive access to the configuration binding memory object upon expiration of a timeout.

10. The system of claim 8, whereas attempt to obtain exclusive access to the configuration binding memory object comprises attempt to allocate the configuration binding memory object.

11. The system of claim 8 further comprises:
responsive to determining that the lifetime of the process has ended, release, by an operating system process, exclusive access to the configuration binding memory object.

12. The system of claim 11, whereas the operating system process is a garbage collector process.

13. The system of claim 8, wherein the configuration binding memory object is a ConfigMap object.

14. The system of claim 8, whereas the configuration binding memory object is associated with an owner reference identifying the process in the leader state.

15. A computer-readable non-transitory storage medium comprising executable instructions that, when executed by a processing device, cause a process of a plurality of processes running on the processing device to:
attempt to obtain exclusive access to a configuration binding memory object associated with a leader state of the plurality of processes of a clusterized service;
responsive to successfully obtaining the exclusive access to the configuration binding memory object, enter the leader state; and
stay in the leader state for a lifetime of the process, wherein to stay in the leader state, the process is to continue to have the exclusive access to the configuration binding memory object for the lifetime of the process.

16. The computer-readable non-transitory storage medium of claim 15, wherein attempt to obtain exclusive access to the configuration binding memory object associated with the leader state further comprises:
responsive to failing to obtain the exclusive access to the configuration binding memory object, repeat an attempt to obtain the exclusive access to the configuration binding memory object upon expiration of a timeout.

17. The computer-readable non-transitory storage medium of claim 15, whereas attempt to obtain exclusive access to the configuration binding memory object comprises attempt to create the configuration binding memory object.

18. The computer-readable non-transitory storage medium of claim 15 further comprises:
responsive to determining that the lifetime of the process has ended, release, by an operating system process, exclusive access to the configuration binding memory object.

19. The computer-readable non-transitory storage medium of claim 15, wherein the configuration binding memory object is a ConfigMap object.

20. The computer-readable non-transitory storage medium of claim 19, wherein the configuration binding memory object comprises an owner reference identifying the process in the leader state.

* * * * *